United States Patent [19]
Burg

[11] 3,865,416
[45] Feb. 11, 1975

[54] SHOCK ABSORBING BUMPER

[76] Inventor: Joseph L. Burg, 490 Martin Ln., Beverly Hills, Calif. 90210

[22] Filed: June 4, 1973

[21] Appl. No.: 366,704

Related U.S. Application Data

[63] Continuation of Ser. No. 173,934, Aug. 23, 1971, abandoned.

[52] U.S. Cl. .................................. 293/87, 293/98
[51] Int. Cl. ............................................ B60r 19/06
[58] Field of Search ............ 293/87, 91, 92, 93, 94, 293/95, 98

[56] References Cited
UNITED STATES PATENTS

| | | |
|---|---|---|
| 1,692,482 | 11/1928 | Wilson.................................. 293/87 |
| 1,839,015 | 12/1931 | Deveaux............................... 293/87 |
| 2,758,866 | 8/1956 | Dollar................................. 293/71 R |
| 2,890,904 | 6/1959 | Materi................................ 293/71 R |
| 3,666,310 | 5/1972 | Burgess et al....................... 293/71 R |

Primary Examiner—M. Henson Wood, Jr.
Assistant Examiner—Robert Saifer
Attorney, Agent, or Firm—Flam & Flam

[57] ABSTRACT

A shock absorbing bumper for a vehicle includes a bumper having compound curvature and exhibiting the characteristics of a Belleville spring. The bumper is mounted to the vehicle by two or more pairs of spaced support brackets bowed in opposite directions and deflecting like C-springs upon impact to the bumper.

2 Claims, 6 Drawing Figures

PATENTED FEB 11 1975 3,865,416

INVENTOR.
JOSEPH L. BURG
BY
Flam and Flam
ATTORNEYS.

SHOCK ABSORBING BUMPER

RELATED APPLICATIONS

This application is a continuation of prior application Ser. No. 173,934, filed Aug. 23, 1971, now abandoned.

BACKGROUND OF THE INVENTION

1. Field of the Invention

The present invention relates to a shock absorbing bumper assembly including a bumper having compound curvature and mounted to a vehicle by sets of C-shaped support brackets.

2. Description of the Prior Art

It has been suggested that the rising cost of automobile collision insurance could be reduced significantly by providing each vehicle with a bumper assembly capable of withstanding greater impact than those now in production without damage to the frame or sheet metal of the vehicle. Increasing the bumper mass represents an expensive, brute force method of accomplishing this objective and will not prevent damage to the vehicle or sheet metal of same. More advantageous is to provide a bumper assembly designed inherently to exhibit a shock absorbing capability.

Shock absorbing bumpers of various types are known in the prior art. In some such devices, a large portion of the energy of impact is dissipated into heat by friction between elastic members, with a portion of the non-dissipated energy being stored against rebound in the stressed elastic members until voluntarily released by the operator. Such an arrangement is illustrated in the U.S. Pat. No. 3,313,567 to Sturman, wherein a rigid bumper is supported by a pair of bolts extending through a plurality of Belleville spring washers. Upon impact, the bumper and bolts are free to move toward the vehicle frame, dissipating energy as the nested spring washers are stressed toward a flatter position. A set of retaining members prevents rebound of the bumper.

An object of the present invention is to provide a new type of sock absorbing bumper, significantly simpler in design, lighter in weight and lower in cost than those of the prior art. The inventive bumper can be mounted to the front or rear of any vehicle without modification to the automobile frame. The inventive bumper design is such that it can be easily modified to meet changing standards for impact absorption, and is simple and inexpensive to maintain.

SUMMARY OF THE INVENTION

To accomplish the foregoing objective, there is provided a shock absorbing bumper assembly utilizing a bumper having compound curvature. The bumper may have the same radius in both horizontal and vertical planes, and may exhibit the characteristics of a Belleville spring.

Advantageously, the bumper is mounted to a vehicle by two or more pairs of vertically spaced, arcuate brackets bowed in opposite vertical directions. Upon impact to the bumper, the support brackets deflect somewhat like C-springs. As a result of the combined bumper and support bracket deflection, the assembly exhibits good shock absorbing properties.

BRIEF DESCRIPTION OF THE DRAWINGS

A detailed description of the invention will be made with reference to the accompanying drawings which, unless indicated as diagrammatic, are to scale.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Structural and operational characteristics attributed to forms of the invention first described also shall be attributed to forms later described, unless such characteristics obviously are inapplicable or unless specific exception is made.

Figure 1:
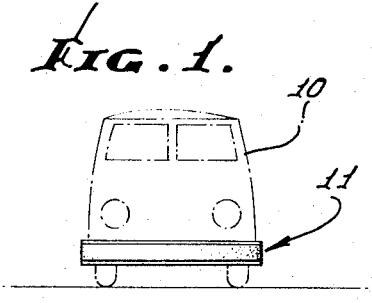
FIG. 1 is a front elevation view of the inventive shock absorbing bumper assembly mounted on a vehicle shown in phantom.
Figure 2:
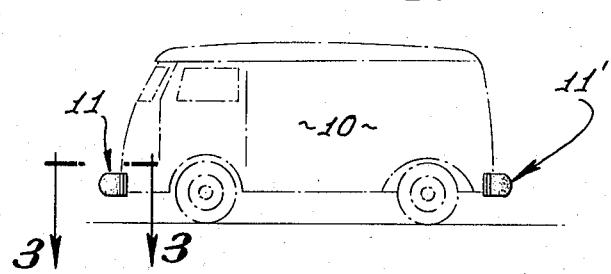
FIG. 2 is a side elevation view of the bumper assembly and vehicle of FIG. 1.

Referring now to the drawings, and particularly to FIGS. 1 and 2 thereof, there is shown a vehicle 10 provided with a front bumper assembly 11 and a rear bumper assembly 11' each in accordance with the present invention. The bumper assembly 11 includes a bumper 12 having a compound curvature, being convex in both the horizontal (FIG. 3) and vertical (FIG. 4) planes. The bumper 12 preferably is fabricated of spring steel or like metal and is covered with a mar-resistant, replaceable facing 13 of resilient material, as for example, a snap-on strip of Neoprene rubber. The metal bumper or rubber strip may be coated to match the vehicle's color.

Figure 4:
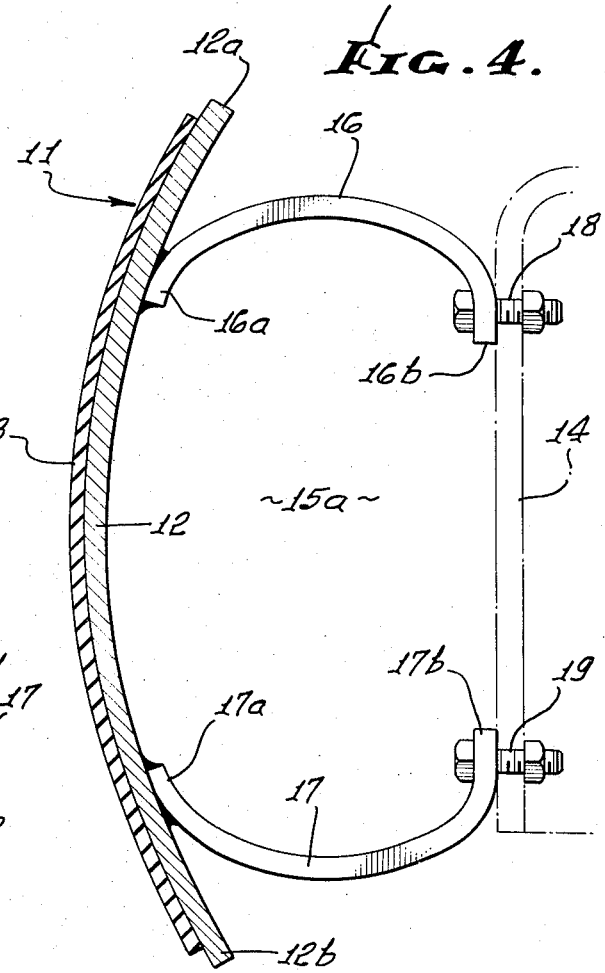
FIG. 4 is a side view of the bumper assembly as seen generally along the line 4—4 of FIG. 3 and showing one set of support brackets.
Figure 5:
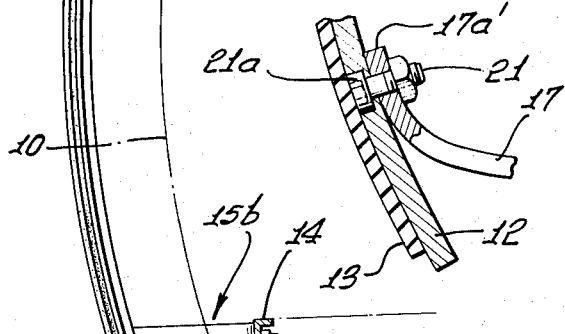
FIG. 5 is a fragmentary side view, partly in section, showing an alternative method of attaching the bumper to the support brackets.

The bumper is mounted to the frame members 14 of the vehicle 10 by two support assemblies 15a, 15b each comprising a pair of vertically spaced, arcuate brackets 16, 17. In the embodiment of FIG. 4, the forward ends 16a, 17a of the brackets 16, 17 are welded to the bumper 12 somewhat inwardly of the respective horizontal bumper edges 12a, 12b. The rear bracket ends 16b, 17b are fastened to the vehicle frame member 14 by means of bolts 18, 19. Alternatively, the bumper 12 may be bolted to the bracket forward ends. Thus in FIG. 5, the bolt 21 fastens the bumper 12 to the bracket forward end 17a'. The bolt head 21a is recessed within the bumper 12 hidden by the facing 13.

The upper support bracket 16 (FIG. 4) is bowed upwardly and the lower bracket 17 is bowed downwardly. Upon impact to the bumper 12, the support brackets 16, 17 act somewhat like C-springs and deflect outwardly to absorb the shock which otherwise would be transmitted to the vehicle frame 14. The spring forward ends 16a, 17a compress toward the respective rear ends 16b, 17b. When the load on the bumper 12 is relieved or the obstruction removed, the support brackets 16, 17 will spring back substantially to their unloaded, C-shaped configuration.

The bumper 12 itself plays a shock absorbing role, operating as a modified Belleville spring. Thus upon impact the bumper 12 tends to flatten, with the horizontal edges 12a, 12b moving further apart. Similarly, the bumper vertical edges 12c, 12d (FIG. 3) tend to separate, the support assemblies 15a, 15b providing the restraint to rearward motion of the bumper requisite to achieve such Belleville spring deflection.

Figure 3:
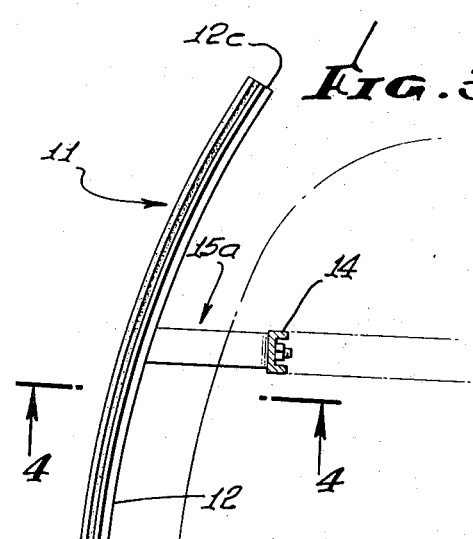
FIG. 3 is a top view, partly in section, of the bumper assembly as seen generally along the line 3—3 of FIG. 2.
Figure 6:
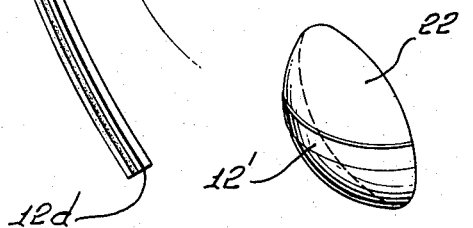
FIG. 6 is a diagrammatic view showing the compound curvature of one embodiment of the bumper of FIG. 1.

Advantageously, the bumper 12 has a constant radius of curvature in the horizontal plane (FIG. 3). This shape enhances the ability of the bumper 12 to deflect glancing impacts. The bumper 12 also may have a constant radius of curvature in the vertical plane, as shown in FIG. 4. Moreover, if the orthogonal radii are the same, the bumper 12 compound curvature corresponds to a portion 12' of a spherical surface. This is illustrated in FIG. 6 wherein the spherical surface section 22 will be recognized as the shape of a conventional Belleville spring.

As an alternative embodiment (not shown), each support assembly may comprise three arcuate support brackets, two bowed in the same vertical direction and the third bowed in the opposite direction.

Thus there is provided a novel bumper assembly combining the shock absorbing qualities of Belleville and C-springs. The bumper assembly is light weight, low in cost, easy to fabricate and can be mounted to any vehicle simply and without modification to the vehicle frame, can be easily modified to meet increasingly stringent impact absorption standards, is virtually marproof, and is maintenance free.

Intending to claim all novel, useful and unobvious features shown or described, the applicant claims:

1. A shock absorbing bumper assembly for a vehicle comprising:
   a. a bumper having compound curvature, said bumper being mounted to said vehicle by two or more pairs of spaced C-shaped support brackets bowed in opposite directions;
   b. the forward end of one support bracket in each pair being rigidly attached to said bumper in vertically spaced relationship with the other support bracket in the pair, the rear ends of said support brackets being rigidly attached to the frame of said vehicle, impact to said bumper causing C-spring-like deflection of said support brackets and Belleville-spring-like deflection of said bumper to absorb the shock of said impact;
   c. said bumper being convex and having a generally constant radius of curvature in the horizontal plane, said bumper also having convex curvature in the vertical plane being the same as that in the horizontal plane.

2. A bumper assembly for a vehicle including a frame and comprising a bumper having compound curvature and mounted to said frame by horizontally spaced support assemblies each comprising first and second vertically separated, arcuate support members bowed in opposite vertical directions, the front ends of said members being fixedly attached to said bumper inwardly of the respective top and bottom edges thereof, the rear ends of said members being fixedly attached to said frame, said compound curvature causing said bumper to flatten upon impact, bowed deflection of said members further absorbing the shock of said impact, the curvature of said bumper conforming to a portion of a spherical surface.

* * * * *